United States Patent Office

3,546,173
Patented Dec. 8, 1970

3,546,173
PROCESS FOR PREPARING CONDENSATES OF PARA-ALKYL PHENOLS AND DIVINYL AROMATIC COMPOUNDS
Oliver Larry Hunt, Waynesboro, Va., assignor to E. I. du Pont de Nemours and Company, Wilmington, Del., a corporation of Delaware
No Drawing. Filed Apr. 10, 1968, Ser. No. 720,372
Int. Cl. C08g 33/10
U.S. Cl. 260—62                     5 Claims

ABSTRACT OF THE DISCLOSURE

A linear resinous condensate of a p-alkyl phenol and a divinyl aromatic compound is prepared by adding a mixture of the divinyl aromatic compound and a minor proportion of the p-alkyl phenol to a solution of the p-alkyl phenol containing a catalyst and a minor proportion of the divinyl aromatic compound.

BACKGROUND OF THE INVENTION

Field of the invention

This invention relates to an improved process for the preparation of condensates from p-alkyl phenols and divinyl aromatic compounds. More particularly, the invention relates to an improved process for preparing a condensate of p-cresol and divinylbenzene.

Description of the prior art

Processes for condensing phenols and divinyl aromatic compounds are known, for example, in the Ohlmann et al. patent, U.S. 2,665,312, and in the Rosenthal et al. patent, U.S. 2,224,837. However, the processes of the prior art lead to an excessive amount of vinyl polymerization i.e., homopolymerization of the divinyl compound. This leads to cross-linked products or to products having an excessive amount of hydrogen atoms ortho to the phenolic hydroxyl groups.

SUMMARY OF THE INVENTION

This invention provides a process for preparing a substantially linear resinous condensate of a p-alkyl phenol and a divinyl aromatic compound comprising the steps of adding the divinyl aromatic compound to a solution of the p-alkyl phenol and reacting them at a temperature less than 55° C. in the presence of a catalyst and a solvent for the reagents and product, each of said reagents containing a minor proportion of the other reagent before the start of the reaction. The resinous condensates produced according to this invention are useful as antioxidants for polyether glycols and as stabilizers for the protection of spandex fibers against yellowing due to a smog atmosphere.

DETAILED DESCRIPTION

The reagents used in the process of this invention are phenols and divinyl aromatic compounds. The phenols are p-alkyl phenols. The alkyl groups in the para-position is a lower alkyl group, i.e., it contains from 1 to about 8 carbon atoms. Both ortho positions in the phenol molecule are unsubstituted.

The divinyl aromatic compounds are divinylbenzene and substituted divinylbenzenes. This reagent must contain two vinyl groups, i.e., —CH=CH$_2$. Isopropenyl groups, i.e., —C(CH$_3$)=CH$_2$, are not satisfactory. The two vinyl groups may be located on the benzene ring in either the meta- or para-positions but may not be ortho to each other. The divinylbenzene should be at least 90% pure. Ordinary commercial divinylbenzene is unsatisfactory for this invention, because only about 55% of the material is divinylbenzene (actually a mixture of divinylbenzenes), the remaining 45% comprising ethylvinylbenzenes, diethylbenzenes, and other ingredients. For this invention, up to about 7% ethylvinylbenzene can be tolerated as an impurity in the divinylbenzene. Careful, high-efficiency distillation, e.g. with a 100-plate column, may be required for purification. The divinylbenzene may be substituted on the ring with groups free of active hydrogen.

In order to minimize residual vinyl unsaturation in the product, the resinous condensate is prepared so that the terminal groups are derived from the phenol. To this end, the process is carried out with an excess of the phenol. The essence of the process is the set of special conditions used to ensure condensation only between the phenol and the divinyl aromatic compound. The condensation is carried out at a temperature below 55° C. in order to avoid vinyl polymerization of the divinyl aromatic compound, thereby avoiding formation of cross-linked polymer and minimizing the presence of unreacted hydrogen atoms ortho to phenolic hydroxyl in the condensate. A portion of the phenol is added to the divinyl aromatic compound without catalyst in order to stabilize the divinyl compound against homopolymerization. The usual Lewis acids are useful catalysts for the condensation reaction, boron trifluoride diethyl etherate being preferred. The condensation is conveniently carried out in hydrocarbon solvents. The product is washed with water to decompose catalyst, and suitable base is added to neutralize any acid residue. After being washed again with water, the product may be taken up in dimethyl acetamide, if desired, and the polymerization solvent and water removed by distillation.

Homopolymerization of the divinyl aromatic compound, as mentioned above, is a harmful side reaction. The special conditions of the process of this invention aid in reducing homopolymerization. A large amount of homopolymerization causes gelation of the reaction system. Even a small amount of homopolymerization is undesirable, since it interferes with the control of molecular weight and molecular weight distribution of the product and also results in product having increased amounts of hydrogen atoms ortho to the phenolic hydroxyl. Such products are less effective anti-oxidants and are more subject to discoloration than products having a negligible amount of hydrogen ortho to the phenolic hydroxyl.

The solvent used in the practice of this invention must be chemically inert to the reagents and to the product under the conditions of the reaction. Many of the hydrocarbon solvents, such as benzene, toluene, xylene and the like, are suitable. The ratio of solvent to total reagents should be from about 0.67 to about 3, so that the solids content of the resulting solution is in the range from 25% to 60% by weight. At a solids content above 60%, the reaction mass becomes so viscous in the latter stages of the reaction that the divinyl aromatic compound homopolymerizes before it becomes mixed with the other ingredients. Solids levels below 15% to 25% often result in excessively slow reactions. As mentioned above, the condensation is carried out at a temperature below 55° C. Preferably, the reaction temperature is between 25° and 35° C.

The process of this invention is useful for the preparation of condensates having a number-average molecular weight of up to about 8000, as determined by vapor pressure osmometry. The molecular weight of the product is regulated by the stoichiometry of the condensation reaction, i.e., by adjusting the ratio of divinyl aromatic compound to p-alkyl phenol. This ratio is less than 1. The molecular weight of the product increases as the ratio increases and approaches 1.

From about 2% to about 10% of the divinyl aromatic compound is added to the p-alkyl phenol before introduction of the catalyst. Preferably about 3% of the divinyl aromatic compound is so added. The catalyst forms a complex with the divinyl aromatic compound, thereby preventing catalyst vapors from contacting the divinylbenzene at the reactor inlet, which could cause excessive homopolymerization of the divinyl compound and possible plugging of the inlet. Presence of more than 10% of the divinyl aromatic compound initially would cause excessive homopolymerization to occur and makes control of the reaction temperature difficult because of excessive evolution of heat when the catalyst is added.

From about 3% to 30% of the p-alkyl phenol, preferably about 10% is added initially to the divinyl aromatic compound in order to inhibit homopolymerization of the divinyl compound before it is well mixed with the p-alkyl phenol in the reactor.

This invention will be further illustrated, but is not intended to be limited, by the following examples in which parts and percentages are by weight unless otherwise specified.

EXAMPLE 1

To a 3-necked flask equipped with stirrer, dropping funnel, nitrogen inlet, condenser and thermometer are added 237 parts of p-cresol and 400 parts of toluene. In the dropping funnel is placed a mixture of 315 parts of divinylbenzene (98% pure) containing 70/30 para/meta isomers, 26 parts of p-cresol and 300 parts of toluene. The stirrer is started and about 18 parts of the mixture in the dropping funnel is added to the flask. Through the condenser 6 parts of boron trifluoride diethyl etherate is added. The remaining mixture in the dropping funnel is added slowly over a period of 2 hours. The flask is cooled as necessary to maintain the temperature below 35° C. during this period and for an additional 16 hours or until the ratio of the heights of the 11.6µ peak to the 12.5µ peak of the infrared spectrum of the flask contents reaches a maximum. The contents of the flask are then neutralized with a dilute aqueous solution of sodium carbonate and the toluene layer separated and washed with distilled water. The toluene layer is then diluted with about 600 parts of dimethylacetamide and the toluene and any residual water removed under vacuum.

For the determination of the molecular weight, a sample is heated to 220° C. to strip off the dimethylacetamide while stirring under nitrogen. After the temperature reaches at least 210° C. a vacuum of about 15 mm. mercury is applied. The molecular weight is 3500 as determined in toluene on a Model 301A Vapor Pressure Osmometer from Mechrolab Inc., 1062 Linda Vista Ave., Mountain View, Calif., according to the procedure of A. P. Brady, H. Huff, and J. W. McBain, Journal of Physical and Colloid Chemistry, 55, 304 (1951). Visual melting point (sample heated 4° C. per minute) is 133–153° C. Melting point by differential thermal analysis is 106° C.

EXAMPLES 2–5

Resinous condensates of different molecular weights are prepared as described in Example 1 by varying the molar ratio of divinylbenzene to p-cresol. Other deviations from Example 1 and the product molecular weights are summarized in the following table:

TABULATION OF REACTION VARIABLES

| Example: | Mole ratio | Neutralizing agent | Time required for DVB addn., hrs. | Parts DMAc [1] | M.W. |
|---|---|---|---|---|---|
| 2 | 0.95 | Na$_2$CO$_3$ | 16 | 600 | 2,460 |
| 3 | 0.93 | Diethylamine | ([2]) | 15 | 2,180 |
| 4 | 0.88 | ....do.... | ([2]) | | 1,730 |
| 5 | 0.84 | ....do.... | ([2]) | | 1,490 |

[1] Added prior to removal of low boilers.
[2] 1 hr. 20 min.

In the above tabulation, DVB stands for divinylbenzene and DMAc stands for dimethylacetamide.

What is claimed is:
1. A process for preparing a substantially linear resinous condensate of a p-lower alkyl phenol and a m- or p-divinyl benzene compound which comprises adding the divinyl benzene compound to a solution of the p-lower alkyl phenol containing a Lewis acid catalyst and permitting the reagents to react while maintaining the temperature below 55° C., the solvent for the p-lower alkyl phenol being an inert hydrocarbon solvent which is also a solvent for the resinous condensate product, each of said reagents containing a minor proportion of the other before the start of the reaction, with the proviso that (1) about 2% to about 10% of the total of said divinyl benzene compound is present in the bulk of said p-lower alkyl phenol and about 3% to 30% of the total p-lower alkyl phenol is present in the bulk of said divinyl benzene compound before the start of the reaction, (2) the ratio of total solvent to total reagents is in the range from about 0.67 to about 3, whereby the solids content of the resulting solution of resinous condensate is in the range from about 25% to about 60% by weight and (3) said divinyl benzene compound is at least 90% pure.

2. Process as defined in claim 1 wherein the p-lower alkyl phenol is p-cresol.

3. Process as defined in claim 2 wherein the catalyst is boron trifluoride diethyl etherate.

4. Process as defined in claim 3 wherein about 3% of the total divinyl benzene is present in the bulk of said p-cresol and about 10% of the total p-cresol is present in the bulk of said divinyl benzene compound before the start of the reaction.

5. Process as defined in claim 4 wherein the reaction temperature is maintained between about 25° C. and 35° C.

References Cited

UNITED STATES PATENTS

| 2,224,837 | 12/1940 | Rosenthal et al. | 260—62 |
| 2,665,312 | 1/1954 | Ohlmann et al. | 260—611.5 |
| 2,687,383 | 8/1954 | D'Alelio | 260—2.2 |
| 3,004,953 | 10/1961 | Sonnabend | 260—62 |
| 3,177,166 | 4/1965 | Gregory et al. | 260—5 |
| 3,328,489 | 6/1967 | Murdock | 260—897 |

WILLIAM H. SHORT, Primary Examiner

M. GOLDSTEIN, Assistant Examiner

U.S. Cl. X.R.

260—859